(12) United States Patent
Dong et al.

(10) Patent No.: US 12,556,816 B2
(45) Date of Patent: Feb. 17, 2026

(54) METHOD FOR GENERATING ROTATION DIRECTION OF GYROSCOPE AND COMPUTER DEVICE

(71) Applicant: ARASHI VISION INC., Shenzhen (CN)

(72) Inventors: Pengfei Dong, Shenzhen (CN); Cong Chen, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/028,516

(22) PCT Filed: Sep. 24, 2021

(86) PCT No.: PCT/CN2021/120272
§ 371 (c)(1),
(2) Date: Mar. 24, 2023

(87) PCT Pub. No.: WO2022/063221
PCT Pub. Date: Mar. 31, 2022

(65) Prior Publication Data
US 2023/0362317 A1    Nov. 9, 2023

(30) Foreign Application Priority Data
Sep. 24, 2020   (CN) .................. 202011018567.3

(51) Int. Cl.
*H04N 23/68* (2023.01)
*G01P 13/04* (2006.01)
*H04N 23/698* (2023.01)

(52) U.S. Cl.
CPC .......... *H04N 23/683* (2023.01); *G01P 13/04* (2013.01); *H04N 23/6812* (2023.01); *H04N 23/698* (2023.01); *G06T 2207/10016* (2013.01)

(58) Field of Classification Search
CPC ............. H04N 23/683; H04N 23/6812; H04N 23/698; G01P 13/04; G06T 2207/10016
See application file for complete search history.

(56) References Cited

U.S. PATENT DOCUMENTS

| 5,794,078 A | 8/1998 | Okazaki |
| 8,781,737 B2 * | 7/2014 | Czompo ................. G01S 19/49 |
| | | 73/178 R |

(Continued)

FOREIGN PATENT DOCUMENTS

| CN | 101109959 A | 1/2008 |
| CN | 103278177 A | 9/2013 |

(Continued)

OTHER PUBLICATIONS

Chillian et al., "Multisensor Data Fusion for Robust Pose Estimation of a Six-Legged Walking Robot ", 2011, IEEE Publication, pp. 2497-2504 (Year: 2011).*

(Continued)

*Primary Examiner* — Elias Desta
(74) *Attorney, Agent, or Firm* — XSENSUS LLP

(57) ABSTRACT

The present application is applicable to the field of video processing, and provides a method for generating a rotation direction of a gyroscope. The method comprises: obtaining an acceleration value and an angular velocity value of an IMU in real time, taking the acceleration value as a first acceleration value, and estimating an attitude from the IMU to a world coordinate system; converting the first acceleration value from an IMU coordinate system to a world coordinate system to obtain a second acceleration value; in the world coordinate system, filtering a second acceleration, and filtering out a gravitational acceleration to obtain a third acceleration; converting the third acceleration into the IMU coordinate system to obtain acceleration components in the X axis, the Y axis and the Z axis of a fourth acceleration; and (Continued)

determining the rotation direction of the gyroscope according to the acceleration components.

17 Claims, 4 Drawing Sheets

(56) References Cited

U.S. PATENT DOCUMENTS

| | | | |
|---|---|---|---|
| 10,124,210 B2 * | 11/2018 | Mather | G06V 40/28 |
| 2011/0218753 A1 | 9/2011 | Ddagawa et al. | |

FOREIGN PATENT DOCUMENTS

| | | | | |
|---|---|---|---|---|
| CN | 106959110 | A | 7/2017 | |
| CN | 107801014 | A | 3/2018 | |
| CN | 108458714 | A | 8/2018 | |
| CN | 109540126 | A | 3/2019 | |
| CN | 109798891 | A | 5/2019 | |
| CN | 110383002 | A | 10/2019 | |
| CN | 110702107 | A | 1/2020 | |
| CN | 110887506 | A | 3/2020 | |
| CN | 110972112 | A | 4/2020 | |
| CN | 112188037 | A | 1/2021 | |
| JP | 2017-187506 | A | 10/2017 | |
| WO | 2017038541 | A1 | 3/2017 | |
| WO | WO-2019119597 | A1 * | 6/2019 | H04N 23/00 |
| WO | 2019/221763 | A1 | 11/2019 | |

OTHER PUBLICATIONS

Wang et al., "CamSwarm: Instantaneous Smartphone Camera Arrays for Collaborative Photography", Jul. 9, 2015, ARXIV Publication, pp. 1-8 (Year: 2015).*
English translation of WO-2019119597-A1 (Year: 2019).*
Shanshan Du, Hao Wu, Jiwen Zhang, Wujian Ma, "Kind of Improving Compensation Filter Algorithm for AHRS", Foreign Electronic Measurement Technology of Chinese Science Technology Core Journal, Mar. 15, 2015, pp. 13-18, vol. No. 34, Issue No. 3 for "Theory and Method", China.
Communication pursuant to Article 94(3) EPC mailed Sep. 8, 2025, in European Application No. 21871590.2, 5 pages.

* cited by examiner

METHOD FOR GENERATING ROTATION DIRECTION OF GYROSCOPE AND COMPUTER DEVICE

CROSS REFERENCE TO RELATED APPLICATIONS

The present invention is a 35 U.S.C. § 371 National Phase conversion of International (PCT) Patent Application No. PCT/CN2021/120272, filed on Sep. 24, 2021, which claims benefit of Chinese Application No. 202011018567.3, filed on Sep. 24, 2020, the disclosure of which is incorporated by reference herein. The PCT International Patent Application was filed and published in Chinese.

BACKGROUND OF THE INVENTION

Field of the Invention

The present invention belongs to the field of video processing, and in particular relates to a method for determining a rotation direction of gyroscope, a method and device for obtaining bullet-time photography effect, a computer-readable storage medium, computer device and a camera.

Description of Related Art

Bullet-time is a computer-aided photography technology used in movies, TV commercials or computer games to simulate variable speed effects, such as enhanced slow motion, time still and other effects. Bullet-time features extreme changes not only in time, but also in space: in slow motion, the shooting angle (viewer's perspective) also rotates around the scene. Yet, this visual special effect of bullet-time seems gorgeous, but the finished product effect often requires artificial careful editing. If there is no artificial adjustment of viewing angle, the people or scenery present in the generated video may fluctuate up and down due to the irregular rotation of the photographer. Its changes are unstable, and it is easy to cause dizziness.

BRIEF SUMMARY OF THE INVENTION

The embodiments of the present invention are to provide a method for determining a rotation direction of gyroscope, a method and device for obtaining bullet-time photography effect, a computer-readable storage medium, computer device and a camera, and aim to solve at least one of above-mentioned problems.

According to a first aspect, the present invention provides a method for determining a rotation direction of a gyroscope, the method includes steps of:
  obtaining an acceleration value and an angular velocity value of an IMU in real time, determining the acceleration value as a first acceleration value, and estimating an attitude from an IMU coordinate system to a world coordinate system;
  converting the first acceleration value from the IMU coordinate system to the world coordinate system to obtain a second acceleration value;
  in the world coordinate system, filtering the second acceleration to remove a gravitational acceleration to obtain a third acceleration;
  converting the third acceleration into the IMU coordinate system to obtain acceleration components along the X axis, the Y axis and the Z axis of a fourth acceleration; and
  determining a rotation direction of the gyroscope on the basis of the acceleration components along the X axis, the Y axis and the Z axis of the fourth acceleration.

According to a second aspect, the present invention provides a device for determining a rotation direction of a gyroscope, the device includes:
  an estimation module, used for obtaining an acceleration value and an angular velocity value of an IMU in real time, determining the acceleration value as a first acceleration value, and estimating an attitude from an IMU coordinate system to a world coordinate system;
  a conversion module, used for converting the first acceleration value from the IMU coordinate system to the world coordinate system to obtain a second acceleration value;
  a filtration module, used for in the world coordinate system, filtering the second acceleration to remove a gravitational acceleration to obtain a third acceleration;
  an acceleration component determination module, used for converting the third acceleration to the IMU coordinate system to obtain the acceleration components along the X axis, the Y axis and the Z axis of the fourth acceleration; and
  a direction determination module, used for determining a rotation direction of the gyroscope on the basis of the acceleration components along the X axis, the Y axis and the Z axis of the fourth acceleration, and determining the rotation direction of the gyroscope as a rotation direction of the camera.

According to a third aspect, the present invention provides a method for obtaining a bullet-time photography effect, the method includes steps of:
  capturing a panoramic video using a camera to rotate around a shooting target;
  performing the steps of the method for determining a rotation direction of a gyroscope described above; and
  generating images corresponding to the rotation direction of the gyroscope in the panoramic video on the basis of the rotation direction of the gyroscope in bullet-time.

According to a fourth aspect, the present invention provides a device for obtaining a bullet-time photography effect includes:
  a capture module, used for capturing a panoramic video using a camera to rotate around a shooting target;
  an estimation module, used for obtaining an acceleration value and an angular velocity value of an IMU in real time, determining the acceleration value as a first acceleration value, and estimating an attitude from an IMU coordinate system to a world coordinate system;
  a conversion module, used for converting the first acceleration value from the IMU coordinate system to the world coordinate system to obtain a second acceleration value;
  a filtration module, used for in the world coordinate system, filtering the second acceleration to remove a gravitational acceleration to obtain a third acceleration;
  an acceleration component determination module, used for converting the third acceleration to the IMU coordinate system to obtain the acceleration components along the X axis, the Y axis and the Z axis of the fourth acceleration;
  a direction determination module, used for determining a rotation direction of the gyroscope on the basis of the acceleration components along the X axis, the Y axis and the Z axis of the fourth acceleration, and determining the rotation direction of the gyroscope as a rotation direction of the camera; and a generation module, used for generating images corresponding to the rotation direction of the gyroscope in the panoramic video on the basis of the rotation direction of the gyroscope in bullet-time.

According to a fifth aspect, the present invention provides a computer-readable storage medium storing a computer program, which when being executed by a processor, cause the processor to perform the steps of the method for determining a rotation direction of gyroscope or the method for obtaining bullet-time photography effect.

According to a sixth aspect, the present invention provides a computer device, includes:
  one or more processors;
  a memory; and
  one or more computer programs, the processors and the memory are connected by a bus; where the one or more computer programs are stored in the memory and configured to be executed by the one or more processors, which when being executed by the one or more processors, cause the one or more processors to perform the steps of the method for determining a rotation direction of a gyroscope or the method for obtaining bullet-time photography effect.

According to a seventh aspect, the present invention provides a camera, includes:
  one or more processors;
  a memory; and
  one or more computer programs, the processors and the memory are connected by a bus; where the one or more computer programs are stored in the memory and configured to be executed by the one or more processors, which when being executed by the one or more processors, cause the one or more processors to perform the steps of the method for determining a rotation direction of gyroscope or the method for obtaining bullet-time photography effect.

Due to the camera accessories, users may install the camera in different ways. For example, the camera is parallel to the rotation axis when the camera is rotated, or the camera is perpendicular to the rotation axis when the camera is rotated, so it is necessary to process different orientations. In embodiments of the present invention, an acceleration value and an angular velocity value of an inertial measurement unit IMU is obtained in real time, and the acceleration value is taken as a first acceleration value, and the first acceleration value is processed to obtain the fourth acceleration, and then the rotation direction of the gyroscope is determined on the basis of the acceleration components along the X axis, the Y axis and the Z axis of the fourth acceleration. Therefore, the rotation direction of the gyroscope in real time can be determined in the present invention, and a bullet-time video with stable visual effects can be obtained without human-computer interaction or careful editing in the later stage, and the method of this invention is simple, fast, and has good robustness.

DETAILED DESCRIPTION OF THE INVENTION

In order to make the objects, technical solution and advantages of the present invention clearer, the present invention will be further described in detail below in conjunction with the accompanying drawings and embodiments. It should be understood that the specific embodiments described here are only used to explain the present invention, and are not intended to limit the present invention.

In order to illustrate the technical solution described in this invention, specific examples are described below.

Figure 1:
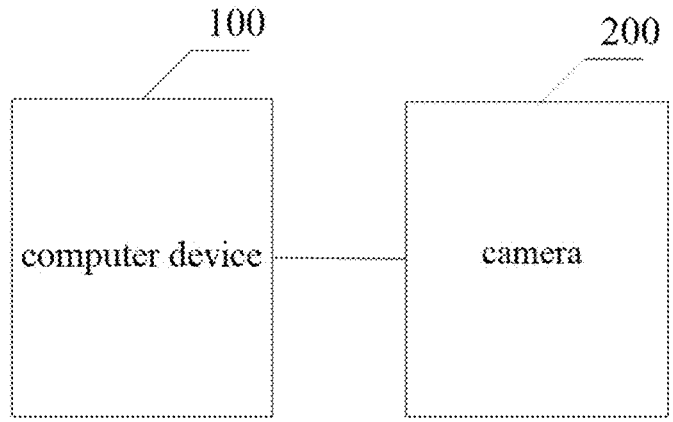
FIG. 1 is a schematic diagram of an application scene of a method for determining a rotation direction of a gyroscope or a method for obtaining a bullet-time photography effect in accordance with an embodiment of the present invention.

The application scene of the method for determining a rotation direction of a gyroscope or the method for obtaining a bullet-time photography effect in accordance with an embodiment of the present invention may be a computer device or a camera. The computer device or the camera performs the method for determining a rotation direction of a gyroscope in accordance with an embodiment of the present invention so as to determine the rotation direction of the gyroscope. Alternatively, when the computer device or the camera executes the method for obtaining a bullet-time photography effect in accordance with an embodiment of the present invention, it first performs the method for determining a rotation direction of a gyroscope in accordance with an embodiment of the present invention to obtain the rotation direction of the gyroscope, and then, on the basis of the rotation direction of the gyroscope, generating images corresponding to the rotation direction of the gyroscope in the panoramic video on the basis of the rotation direction of the gyroscope. The application scene of the method for determining a rotation direction of a gyroscope or the method for obtaining a bullet-time photography effect in accordance with an embodiment of the present invention may also include a computer device 100 and a camera 200 (as shown in FIG. 1) connected to each other. At least one computer program is executed in the computer device 100 and the camera 200. The computer device 100 may be a server, a desktop computer, a mobile terminal or the like, and the mobile terminal includes a mobile phone, a tablet computer, a notebook computer, a personal digital assistant, or the like. The camera 200 may be a common camera or a panoramic camera. A common camera can be used for taking two-dimensional images and two-dimensional videos. The computer device or the camera performs the method for determining a rotation direction of a gyroscope in accordance with an embodiment of the present invention so as to determine the rotation direction of the gyroscope. Alternatively, when the computer device or the camera executes the method for obtaining a bullet-time photography effect in accordance with an embodiment of the present invention, it first executes the method for determining a rotation direction of a gyroscope in accordance with an embodiment of the present invention to obtain the rotation direction of the gyroscope, and then, on the basis of the rotation direction of the gyroscope, generating images corresponding to the direction of the gyroscope in the panoramic video.

Figure 2:
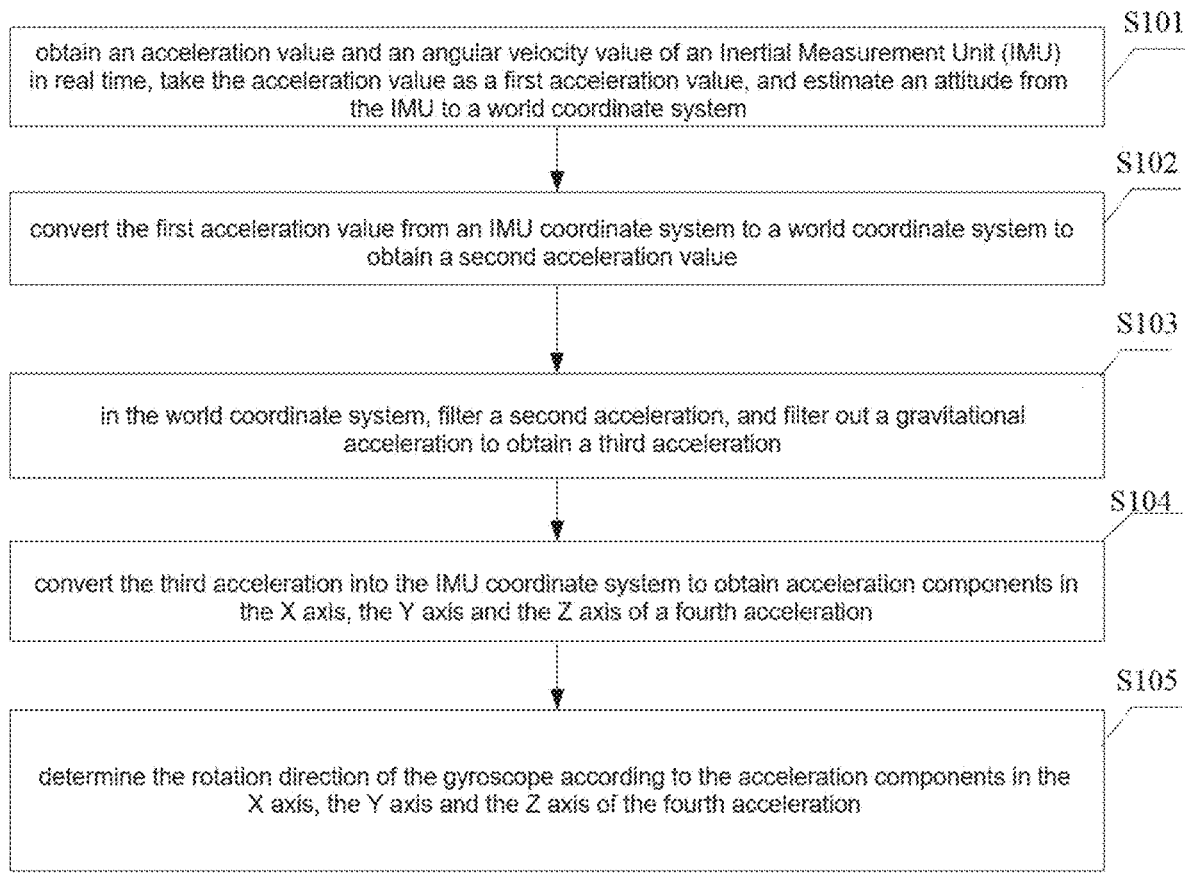
FIG. 2 is a flowchart of a method for determining a rotation direction of a gyroscope in accordance with an embodiment of the present invention.

FIG. 2 is a flowchart of a method for determining a rotation direction of a gyroscope in accordance with an embodiment of the present invention. The method for determining a rotation direction of a gyroscope in accordance with an embodiment of the present invention includes the following steps of S101 to S105.

S101: obtaining an acceleration value and an angular velocity value of an IMU (Inertial measurement unit) in real time, determining the acceleration value as a first acceleration value, and estimating an attitude from an IMU coordinate system to a world coordinate system.

IMU is a device that measures the three-axis attitude angle (or angular velocity value) and acceleration value of an object. Generally, an IMU includes a three-axis accelerometer and a three-axis gyroscope. The accelerometer detects the three-axis acceleration signals of an object in a carrier coordinate system, and the gyroscope detects the angular velocity signal of the carrier relative to the navigation coordinate system, and measures the object in a three dimensions. It measures the angular velocity and acceleration value of the object in three-dimensional space, and calculates the attitude of the object based on the angular velocity and acceleration value.

In an embodiment of the present invention, the step of obtaining an acceleration value and angular velocity value of an IMU in real time, may specifically be: obtaining an acceleration value of a three-axis accelerometer using a gravity sensor, and obtaining an angular velocity value of a three-axis gyroscope using an angular velocity sensor.

Estimating an attitude from an IMU coordinate system to a world coordinate system may specifically be: using a Kalman filter to estimate an attitude from the IMU coordinate system to the world coordinate system. Specifically, can be, using an extended Kalman filter to combine the acceleration value and the angular velocity value to estimate a rotation amount $$R_{i\_w}^{k}$$

from the IMU coordinate system to the world coordinate system. Specifically, it includes the following steps of:

S1011: calculating an initial state rotation amount $$q_0^+$$

according to a formula $$q_0^+ = \exp\left[-\frac{d_0 \times g}{|d_0 \times g|} * a\cos(d_0 \cdot g)\right]_x,$$

wherein $d_0$ is the acceleration value measured initially, and g is the gravity vector of the world coordinate system; and calculating an initial process covariance $$P_0^+$$

according to the formula $$P_0^+ = \begin{bmatrix} 25.0 & 0 & 0 \\ 0 & 25.0 & 0 \\ 0 & 0 & 25.0 \end{bmatrix};$$

S1012: calculating a state transition matrix $\Phi(\omega k)$ at time k on the basis of an angular velocity value $\omega k$ at time k;

Specifically, the state transition matrix at time k is calculated according to the formula $\Phi(\omega k) = \exp(-[\omega k \cdot \Delta t]_x)$, and $\Delta t$ represents a sampling interval of gyroscope data.

S1013: calculating a covariance matrix $Q_k$ of a state noise according to the sampling time interval $\Delta t$ of gyroscope data, updating a state rotation prior estimation $$q_k^-$$

and a process covariance prior estimation matrix $$p_k^-.$$

The formula is:

$$Q_k = \begin{bmatrix} \Delta t^2 & & \\ & \Delta t^2 & \\ & & \Delta t^2 \end{bmatrix}; q_k^- = \Phi(\omega_k) * q_{k-1}^+,$$

where $$q_{k-1}^+$$

is a state rotation posterior estimation at time k−1;

$$p_k^- = q_k^- \cdot p_{k-1}^+ \cdot q_k^- + Q_k, \text{ where, } p_{k-1}^+$$

is a process covariance posterior estimation matrix at time k−1.

S1014: updating an observation noise covariance matrice $R_k$ on the basis of the acceleration value $d_k$ at time k, and calculating a Jacobian observation transition matrix $H_k$, calculating a current observation and an estimated observation errors $e_k$ specifically, $$R_k = \begin{bmatrix} \delta^k & & \\ & \delta^k & \\ & & \delta^k \end{bmatrix}, \text{ where, } \delta^k = \delta_{var}^k + \delta_{mean}^k,$$

$$\delta_{var}^k = \alpha||d_k| - |d_{k-1}|| + (1-\alpha)\delta_{var}^{k-1}, \delta_{mean}^k = \beta\left||\delta_k| + \frac{1}{|d_k|} - 2\right|,$$

α is a smoothing factor of the acceleration variation, β is an influence factor of the acceleration modulus;

$$H_k = \frac{\partial h}{\partial q}|_{q_k^-},$$

where, h is an observation function, $h(q,v)=q \cdot g+v_k$, g is the gravity vector in the world coordinate system, q is a rotation amount from the world coordinate system to the gyroscope coordinate system, and $v_k$ is the measurement noise;

$$e_k = d_k \times h(q_k^-, 0).$$

S1015: updating an optimal Kalman gain matrix $K_k$ at time k;

$$K_k = p_k^- \cdot H_k^T (H_k \cdot p_k^- \cdot H_k^T + R_k)^{-1};$$

S1016: updating a state rotation posterior estimation $$q_k^+$$

and a process covariance posterior estimation matrix $$P_k^+$$

from the IMU coordinate system to the world coordinate system at time k on the basis of the optimal Kalman gain matrix $K_k$ and the estimated observation error $e_k$, determining the updated state rotation posterior estimation $$q_k^+$$

as a rotation amount $$R_{i\_w}^k$$

from the IMU coordinate system to the world coordinate system;

$$q_k^+ = \exp([K_k \cdot e_k]_x) \cdot q_k^-$$
$$P_k^+ = \exp([K_k \cdot e_k]_x) \cdot p_k^- \cdot \exp([K_k \cdot e_k]_x).$$

In one embodiment of the present invention, the following steps may be further included after step S101: performing noise reduction on the first acceleration value using a low-pass filter to obtain the first acceleration value $$d_i'$$

after low-pass filtering and noise reduction, and particularly includes:

performing low-pass filtering and noise reduction on the first acceleration value based on formula $$d_i' = \alpha \cdot d_i + (1-\alpha) \cdot R_i \cdot d_{i-1}',$$

wherein, $$d_i'$$

represents the first acceleration value after low-pass filtering and noise reduction at time i, $d_i$ represents the first acceleration value at time i, $R_i$ is a relative rotation amount of the gyroscope at the $i^{th}$ frame in a video, $R_i = \exp[-\omega_i \cdot \Delta t]_x$, $\omega_i$ represents the angular velocity value at the time i, $$d_{i-1}'$$

represents the first acceleration value after low-pass filtering and noise reduction at time (i−1), α represents the smoothing factor, $$\alpha = \frac{\Delta t}{Rc + \Delta t}, Rc = \frac{1}{2\pi f_c},$$

where, $f_c$ represents a cutoff frequency of the low-pass filter, $R_c$ represents a time constant, and $\Delta t$ represents a sampling interval of gyroscope data.

Extended Kalman Filtering: it is to linearize a nonlinear system and then perform Kalman filtering. The Kalman filter is a high-efficient recursive filter that can estimate the state of a dynamic system from a series of measurements that do not completely contain noise.

S102: converting the first acceleration value from the IMU coordinate system to the world coordinate system to obtain a second acceleration value.

In an embodiment of the present invention, S102 may specifically include:

according to the formula $$A_w^k = R_{i\_w}^{k-1} * d_i'$$

at time k, converting the first acceleration value from the IMU coordinate system to the world coordinate system to obtain the second acceleration value $$A_w^K, \text{ where, } R_{i\_w}^k$$

is an estimated rotation amount from the IMU coordinate system to the world coordinate system, and $$d_i'$$

is the first acceleration value after low-pass filtering and noise reduction.

S103: in the world coordinate system, filtering the second acceleration to remove a gravitational acceleration to obtain a third acceleration.

In an embodiment of the present invention, S103 may specifically be:

in the world coordinate system, at time k, moving the gravitational acceleration from the second acceleration value $$A_w^K$$

to obtain the third acceleration $$Acc_w^k;$$

removing the gravitational acceleration using a high-pass filter, and the formula of high-pass filter is $$|H_h(w)|^2 = \frac{1}{1 + \left(\frac{w_c}{w}\right)^{2n}},$$

where, $H_h(w)$ represents a medium of the high-pass filter; where, n is an order of the filter, which can be obtained from a preset value, for example, n=4, w is the frequency, and $w_c$ is a cutoff frequency. The cutoff frequency of the high-pass filter is preset to $$\frac{1}{50}\Pi \text{ rad/s}$$

(This is the normalized cutoff frequency, which is the cutoff frequency divided by the sampling frequency, and is expressed by the angular frequency).

A high-pass filter, also known as a low-cutoff filter or a low resistance filter, is a filter that allows frequencies higher than a certain cut-off frequency to pass, while greatly attenuating lower frequencies. It removes unnecessary low-frequency components in the signal or removes low-frequency interference.

In one embodiment of the present invention, before filtering the second acceleration, the method may further include the following steps of:

in the world coordinate system, at time k, performing noise reduction on the second acceleration value $$A_w^K.$$

Noise reduction can be performed using a Butterworth low-pass filter, and the formula of Butterworth low-pass filter is $$|H_b(w)|^2 = \frac{1}{1 + \left(\frac{w}{w_c}\right)^{2n}},$$

where, $H_b(w)$ represents a medium of the low-pass filter, n is an order of the filter, which can be obtained from a preset value, such as n=4, w is the frequency, and $w_c$ is a cut-off frequency. The cutoff frequency of the Butterworth low-pass filter can be preset to $$\frac{2}{3}\Pi \text{ rad/s},$$

(This is the normalized cutoff frequency, which is the cutoff frequency divided by the sampling frequency, and is expressed by the angular frequency). Thereby, the effect of noise is removed and the result is more stable.

Butterworth filter is a kind of electronic filter, and it is also called maximally flat filter. The Butterworth filter features that the frequency response curve in the passband is as flat as possible without ripples, and gradually drops to zero in the stopband.

S104: converting the third acceleration into the IMU coordinate system to obtain acceleration components along the X axis, the Y axis and the Z axis of a fourth acceleration.

In an embodiment of the present invention, S104 may specifically be: calculating the fourth acceleration $$Acc_{imu}^k$$

according to a formula:

$$Acc_{imu}^k = R_{i\_w}^{k-1} Acc_w^k, \text{ where } R_{i\_w}^{k-1}$$

is a rotation matrix from the world coordinate system to the IMU coordinate system at time k, and $$Acc_w^k$$

is the third acceleration.

S105: determining a rotation direction of the gyroscope on the basis of the acceleration components along the X axis, the Y axis and the Z axis of the fourth acceleration.

In one embodiment of the present invention, the step of determining a rotation direction of the gyroscope on the basis of the acceleration components along the X axis, the Y axis and the Z axis of a fourth acceleration, may include steps of:

comparing the acceleration components along the X axis, the Y axis and the Z axis of the fourth acceleration to determine the axis corresponding to the maximum acceleration component, and determining the rotation direction of the gyroscope as: a direction of a rotation axis when the axis, corresponding to and in the same direction as the maximum acceleration component, rotates towards a camera.

In an embodiment of the present invention, after determining a rotation direction of the gyroscope on the basis of the acceleration components along the X axis, the Y axis and the Z axis of the fourth acceleration, the method may further include a step of:

determining the rotation direction of the gyroscope as a rotation direction of the camera, and determining a positional relationship between the camera and the rotation axis on the basis of the rotation direction of the gyroscope.

Figure 3:
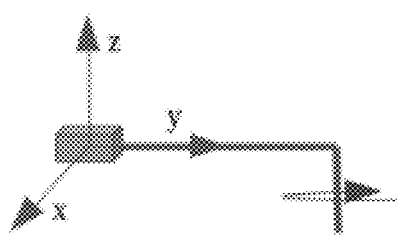
FIGS. 3 to 8 are schematic diagrams for analyzing the rotation direction of the gyroscope.

As shown in FIG. 3, if the acceleration component along the Y-axis of the fourth acceleration is greater than the acceleration components along the X-axis and Z-axis of the fourth acceleration, and the direction of the acceleration component is the same as the positive half-axis of the Y-axis, it means that at this time, the rotation direction of the gyroscope is the direction of the rotation axis when the positive half-axis of the Y-axis rotates towards the camera. That is, the rotation direction of the camera is the direction of the rotation axis when the positive half-axis of the Y-axis rotates towards the camera. According to the rotation direction of the gyroscope, it can be determined that the camera is perpendicular to the rotation axis when the camera rotates, and a top of the camera faces the rotation axis when the camera rotates.

Figure 4:
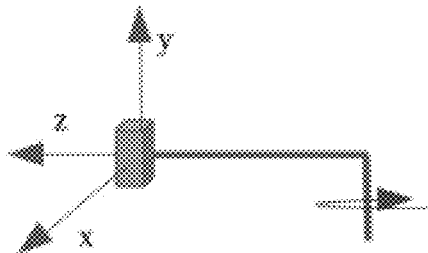

As shown in FIG. 4, if the acceleration component along the Z-axis of the fourth acceleration is greater than the acceleration components along the X-axis and Y-axis of the fourth acceleration, and the direction of the acceleration component is in the same direction as the negative half-axis of the Z-axis, it means that at this time, the rotation direction of the gyroscope is the direction of the rotation axis when the negative half-axis of the Z-axis rotates towards the camera. That is, the rotation direction of the camera is the direction of the rotation axis when the negative half-axis of the Z-axis rotates toward the camera. According to the rotation direction of the gyroscope, it can be determined that the camera is parallel to the rotation axis when the camera rotates, and a positional relationship between the camera and the rotation axis is that: a first side of the camera is facing the rotation axis when the camera rotates.

Figure 5:
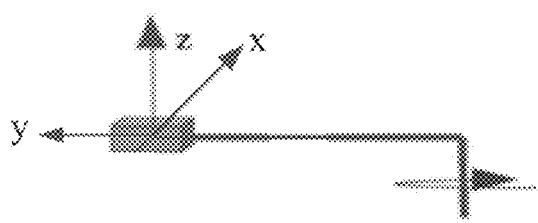

As shown in FIG. 5, if the acceleration component along the Y-axis of the fourth acceleration is greater than either of the acceleration components along the X-axis and Z-axis of the fourth acceleration, and the direction of the acceleration component is in the same direction as the negative half-axis of the Y-axis, it means that at this time, the rotation direction of the gyroscope is the direction of the rotation axis when the negative half-axis of the Y axis rotates towards the camera. That is, the rotation direction of the camera is the direction of the rotation axis when the negative half-axis of the Y-axis rotates toward the camera. According to the rotation direction of the gyroscope, it can be determined that the camera is perpendicular to the rotation axis when the camera rotates, and a positional relationship between the camera and the rotation axis is that: a bottom of the camera is facing the rotation axis when the camera rotates.

Figure 6:
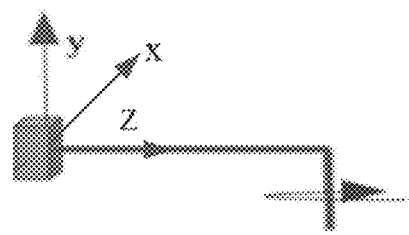

As shown in FIG. 6, if the acceleration component along the Z-axis of the fourth acceleration is greater than either of the acceleration components along the X-axis and Y-axis of the fourth acceleration, and the direction of the acceleration component is in the same direction as the positive half-axis of the Z-axis, it means that at this time, the rotation direction of the gyroscope is the direction of the rotation axis when the positive half-axis of the Z axis rotates towards the camera. That is, the rotation direction of the camera is the direction of the rotation axis when the positive half-axis of the Z-axis rotates toward the camera. According to the rotation direction of the gyroscope, it can be determined that the camera is parallel to the rotation axis when the camera rotates, and a positional relationship between the camera and the rotation axis is that a second side of the camera is facing the rotation axis when the camera rotates.

Figure 7:
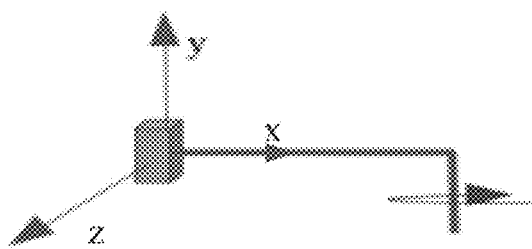

As shown in FIG. 7, if the acceleration component along the X-axis of the fourth acceleration is greater than either of the acceleration components along the Y-axis and Z-axis of the fourth acceleration, and the direction of the acceleration component is the same as the positive half-axis of the X-axis, it means that at this time, the rotation direction of the gyroscope is the direction of the rotation axis when the positive half-axis of the X-axis rotates towards the camera. That is, the rotation direction of the camera is the direction of the rotation axis when the positive half-axis of the X-axis rotates toward the camera. According to the rotation direction of the gyroscope, it can be determined that the camera is parallel to the rotation axis when the camera rotates, and a positional relationship between the camera and the rotation axis is that: a third side of the camera faces the rotation axis when the camera rotates.

Figure 8:
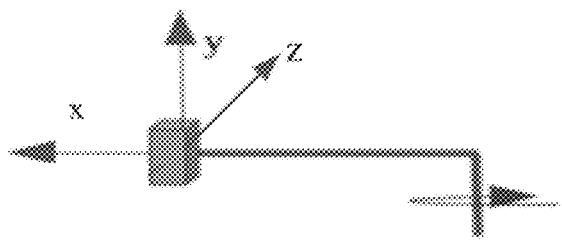

As shown in FIG. 8, if the acceleration component along the X-axis of the fourth acceleration is greater than either of the acceleration components along the Y-axis and Z-axis of the fourth acceleration, and the direction of the acceleration component is in the same direction as the negative half-axis of the X-axis, it means that at this time, the rotation direction of the gyroscope is the direction of the rotation axis when the negative half-axis of the X-axis rotates towards the camera. That is, the rotation direction of the camera is the direction of the rotation axis when the negative half-axis of the X-axis rotates toward the camera. According to the rotation direction of the gyroscope, it can be determined that the camera is perpendicular to the rotation axis when the camera rotates, and a positional relationship between the camera and the rotation axis is that: a fourth side of the camera faces the rotation axis when the camera rotates.

The above are only preferred embodiments of the present invention. When the camera is rotated at other angles towards the rotation axis of the camera, the rotation direction of the gyroscope is shown in FIGS. 3 to 8, and it will not be repeated here.

Figure 9:
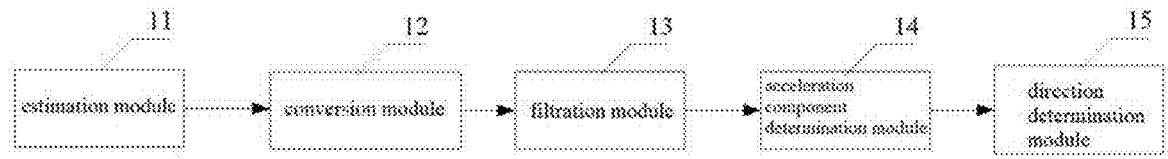
FIG. 9 is a schematic diagram of a device for determining a rotation direction of a gyroscope in accordance with an embodiment of the present invention.

Please refer to FIG. 9, a device for determining a rotation direction of a gyroscope in accordance with an embodiment of the present invention may be a computer program or a set of program instructions running in a computer device or a camera. For example, the device for determining a rotation direction of a gyroscope is an application software; the device for determining a rotation direction of a gyroscope may be used to execute corresponding steps of the method for determining a rotation direction of a gyroscope provided in the embodiments of the present invention.

A device for determining a rotation direction of a gyroscope in accordance with an embodiment of the present invention includes:
- an estimation module 11, used for obtaining an acceleration value and an angular velocity value of an IMU in real time, determining the acceleration value as a first acceleration value, and estimating an attitude from an IMU coordinate system to a world coordinate system;
- a conversion module 12, used for converting the first acceleration value from the IMU coordinate system to the world coordinate system to obtain a second acceleration value;
- a filtration module 13, used for in the world coordinate system, filtering the second acceleration to remove a gravitational acceleration to obtain a third acceleration;
- an acceleration component determination module 14, used for converting the third acceleration to the IMU coordinate system to obtain the acceleration components along the X axis, the Y axis and the Z axis of the fourth acceleration; and
- a direction determination module 15, used for determining a rotation direction of the gyroscope on the basis of the acceleration components along the X axis, the Y axis and the Z axis of the fourth acceleration, and determining the rotation direction of the gyroscope as a rotation direction of the camera.

The device for determining a rotation direction of a gyroscope in accordance with an embodiment of the present invention and the method for determining a rotation direction of a gyroscope in accordance with an embodiment of the present invention share the same idea, and its specific implementation process can be found in the full text of the specification, and will not be repeated here.

An embodiment of the present invention also provides a method for obtaining a bullet-time photography effect. In this embodiment, as an example for illustration, the method for obtaining a bullet-time photography effect is applied to a computer device or a camera. The difference between the method for obtaining a bullet-time photography effect in accordance with an embodiment of the present invention and the method for determining a rotation direction of a gyroscope in accordance with an embodiment of the present invention is that:

before S101, the following step is also involved: capturing a panoramic video using a camera to rotate around a shooting target; and after S105, the following step is also involved: generating images corresponding to the rotation direction of the gyroscope in the panoramic video on the basis of the rotation direction of the gyroscope in bullet-time.

Figure 10:
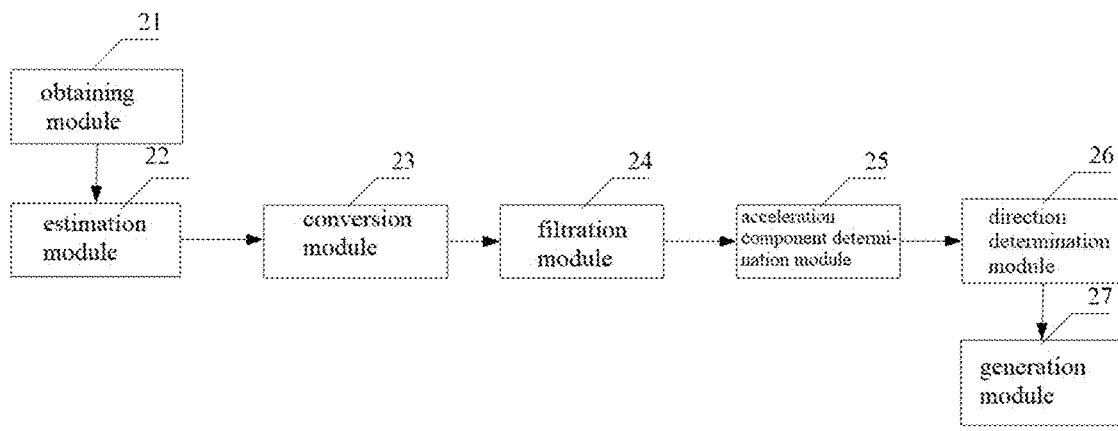
FIG. 10 is a schematic diagram of a device for obtaining a bullet-time photography effect in accordance with an embodiment of the present invention.

Referring to FIG. 10, a device for obtaining a bullet-time photography effect in accordance with an embodiment of the present invention may be a computer program or a set of program instructions running in a computer device or a camera. For example, the device for obtaining a bullet-time photography effect is an application software; the device for obtaining a bullet-time photography effect may be used to perform corresponding steps of the method for obtaining a bullet-time photography effect provided in the embodiments of the present invention. The device for obtaining a bullet-time photography effect in accordance with an embodiment of the present invention includes:

a capture module 21, used for capturing a panoramic video using a camera to rotate around a shooting target;

an estimation module 22, used for obtaining an acceleration value and an angular velocity value of an IMU in real time, determining the acceleration value as a first acceleration value, and estimating an attitude from an IMU coordinate system to a world coordinate system;

a conversion module 23, used for converting the first acceleration value from the IMU coordinate system to the world coordinate system to obtain a second acceleration value;

a filtration module 24, used for in the world coordinate system, filtering the second acceleration to remove a gravitational acceleration to obtain a third acceleration;

an acceleration component determination module 25, used for converting the third acceleration to the IMU coordinate system to obtain the acceleration components along the X axis, the Y axis and the Z axis of the fourth acceleration;

a direction determination module 26, used for determining a rotation direction of the gyroscope on the basis of the acceleration components along the X axis, the Y axis and the Z axis of the fourth acceleration, and determining the rotation direction of the gyroscope as a rotation direction of the camera; and a generation module 27, used for generating images corresponding to the rotation direction of the gyroscope in the panoramic video on the basis of the rotation direction of the gyroscope in bullet-time.

The device for obtaining a bullet-time photography effect in accordance with an embodiment of the present invention and the method for obtaining a bullet-time photography effect in accordance with an embodiment of the present invention belong to the same idea, and its specific implementation process can be found in the full text of the description, and will not be repeated here.

An embodiment of the present invention also provides a computer-readable storage medium, the computer-readable storage medium stores a computer program, and when the computer program is executed by a processor, cause the processor to perform the steps of the method for determining a rotation direction of gyroscope or the method for obtaining bullet-time photography effect.

Figure 11:
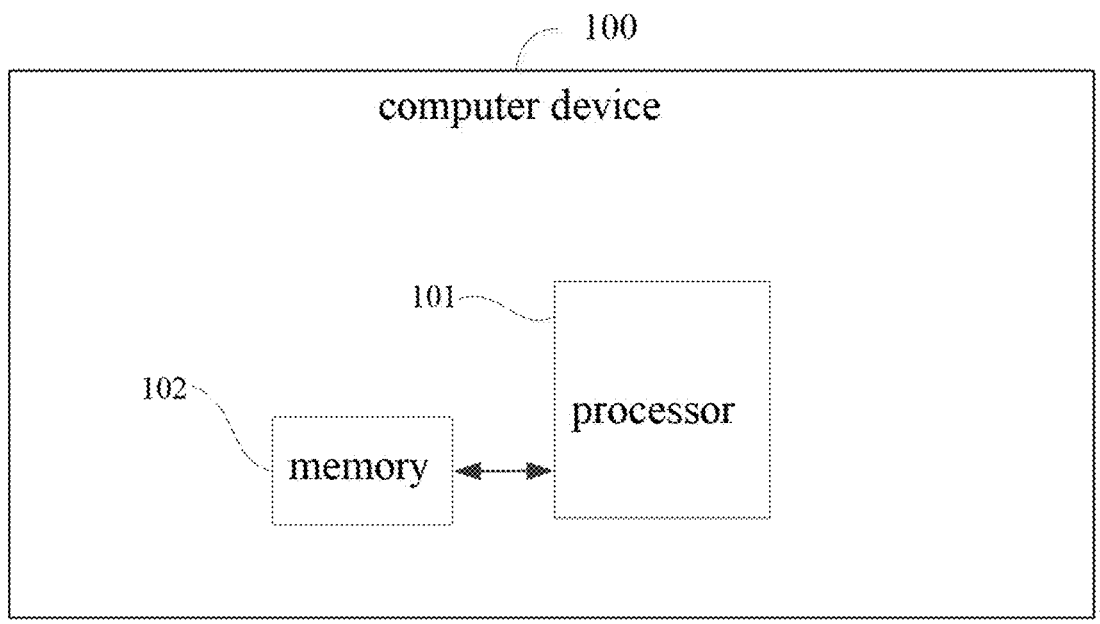
FIG. 11 is a block diagram of a computer device in accordance with an embodiment of the present invention.

FIG. 11 shows block diagram of a computer device in accordance with an embodiment of the present invention. The computer device may be as shown in FIG. 1, and a computer device 100 includes: one or more processors 101, memory 102, and one or more computer programs. The processors 101 and the memory 102 are connected by a bus, where the one or more computer programs are stored in the memory 102 and configured to be executed by the one or more processors 101, and when the computer programs are executed by the processor 101, cause the one or more processors 11 to perform the steps of the method for determining a rotation direction of a gyroscope or the method for obtaining a bullet-time photography effect.

The computer device may be a server, a desktop computer, a mobile terminal, or the like, and the mobile terminal includes a mobile phone, a tablet computer, a notebook computer, a personal digital assistant, and the like.

Figure 12:
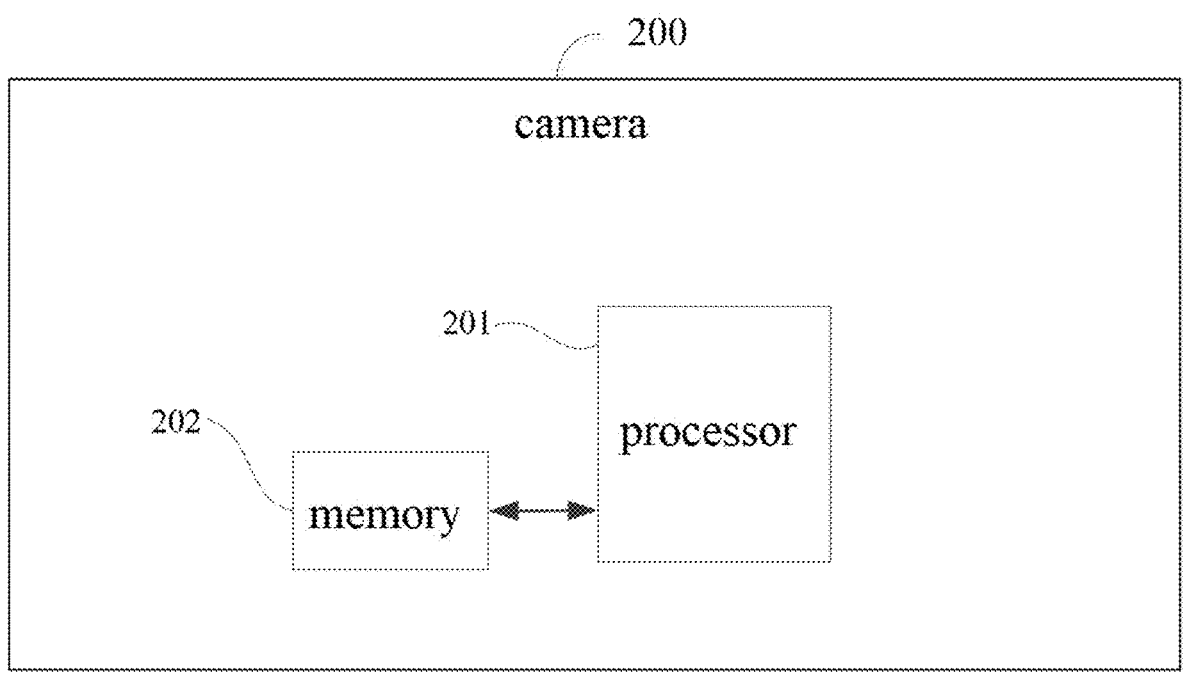
FIG. 12 is a block diagram of a camera in accordance with an embodiment of the present invention.

FIG. 12 shows a block diagram of a camera in accordance with an embodiment of the present invention, and the camera may be as shown in FIG. 1. A camera 200 includes: one or more processors 201, a memory 202, and one or more computer programs, where the processor 201 and the memory 202 are connected via a bus. The one or more computer programs are stored in the memory 202 and configured to be executed by the one or more processors 201, and when the computer programs are executed by the one or more processors 201, cause the one or more processors 201 to perform the steps of the method for determining a rotation direction of a gyroscope or the method for obtaining a bullet-time photography effect.

Due to the camera accessories, users may install the camera in different ways. For example, the camera is parallel to the rotation axis when the camera is rotated, or the camera is perpendicular to the rotation axis when the camera is rotated, so it is necessary to process different orientation. In embodiments of the present invention, an acceleration value and angular velocity value of an inertial measurement unit IMU is obtained in real time, the acceleration value is taken as a first acceleration value, and the first acceleration value is processed to obtain a fourth acceleration, and then the rotation direction of the gyroscope is determined on the basis of the acceleration components along the X axis, the Y axis and the Z axis of the fourth acceleration. Therefore, the method of this invention can determine the rotation direction of the gyroscope in real time, and can generate a bullet-time video with stable visual effects without human-computer interaction or careful editing in the later stage, and the method for this invention is simple, fast, and has good robustness.

It should be understood that the various steps in the various embodiments of the present invention are not necessarily executed sequentially in the order indicated by the step numbers. Unless otherwise specified herein, there is no strict order restriction on the execution of these steps, and these steps can be executed in other orders. Moreover, at least some of the steps in each embodiment may include multiple sub-steps or multiple stages, and these sub-steps or stages are not necessarily executed at the same time, but may be executed at different times. The execution order of these sub-steps or stages is not necessarily performed sequentially, but may be executed alternately or alternately with at least a part of other steps or sub-steps or stages of other steps.

Those of ordinary skill in the art can understand that: to realize all or part of the flow in the methods of the above-mentioned embodiments, it can be completed by instructing related hardware through a computer program. The program can be stored in a non-volatile computer-readable storage medium, and when the program is executed to perform the methods in the above-mentioned embodiments. Here, any references to memory, storage, database or other media used in the various embodiments provided in the present invention may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory for illustration and not limitation, RAM is available in many forms such as Static RAM (SRAM), Dynamic RAM (DRAM), Synchronous DRAM (SDRAM), Double Data Rate SDRAM (DDRSDRAM), Enhanced SDRAM (ES-DRAM), Synchronous Chain Synchlink DRAM (SL-DRAM), memory bus (Rambus) direct RAM (RDRAM), direct memory bus dynamic RAM (DRDRAM), and memory bus dynamic RAM (RDRAM), and the like.

The technical features of the above embodiments can be combined arbitrarily, and all possible combinations of the technical features of the above embodiments are not described in order to simplify the description. However, as long as there is no contradiction in the combination of these technical features, it should be considered as within the scope of the description.

The above embodiments only express several embodiments of the present invention, and the description thereof is relatively specific and detailed, but it should not be construed as limiting the scope of the present invention. It should be pointed out that those skilled in the art can make several modifications and improvements without departing from the concept of the present invention, and these all belong to the protection scope of the present invention. Therefore, the protection scope of the present invention should be defined by the appended claims.

What is claimed is:

1. A method for detensioning a rotation direction of a gyroscope, comprising steps of:
   obtaining an acceleration value and an angular velocity value of an IMU in real time, determining the acceleration value as a first acceleration value, and estimating an attitude from an IMU coordinate system to a world coordinate system;
   converting the first acceleration value from the IMU coordinate system to the world coordinate system to obtain a second acceleration value;
   in the world coordinate system, filtering the second acceleration value to remove a gravitational acceleration to obtain a third acceleration value;
   converting the third acceleration value into the IMU coordinate system to obtain acceleration components along an X axis, a Y axis and a Z axis of a fourth acceleration value; and
   determining a rotation direction of the gyroscope on the basis of the acceleration components along the X axis, the Y axis and the Z axis of the fourth acceleration value,
   wherein the step of determining the rotation direction of the gyroscope on the basis of the acceleration components along the X axis, the Y axis and the Z axis of the fourth acceleration comprises:
   comparing the acceleration components along the X axis, the Y axis and the Z axis of the fourth acceleration value to determine an axis corresponding to a maximum acceleration component, and determining the rotation direction of the gyroscope as: a direction of a rotation axis when the axis, corresponding to and in the same direction as the maximum acceleration component, rotates towards a camera.

2. The method according to claim 1, wherein the step of estimating the attitude from the IMU coordinate system to the world coordinate system comprises a step of estimating the attitude from the IMU coordinate system to the world coordinate system using a Kalman filter.

3. The method according to claim 2, wherein the step of estimating the attitude from the IMU coordinate system to the world coordinate system using the Kalman filter comprises: estimating a rotation amount from the IMU coordinate system to the world coordinate system using an Extended Kalman Filtering and on the basis of the acceleration value and the angular velocity value.

4. The method according to claim 1, wherein after the step of determining the acceleration value as the first acceleration value, the method further comprises: a step of performing noise reduction on the first acceleration value using a low-pass filter to obtain the first acceleration value $$d'_i$$

after low-pass filtering and noise reduction.

5. The method according to claim 4, wherein the step of performing noise reduction on the first acceleration value using the low-pass filter to obtain the first acceleration value $$d'_i$$

after low-pass filtering and noise reduction comprises:
   performing low-pass filtering and noise reduction on the first acceleration value based on formula $$d'_i = \alpha \cdot d_i + (1 - \alpha) \cdot R_1 \cdot d'_{i-1}, \text{ wherein, } d'_i$$

represents the first acceleration value after low-pass filtering and noise reduction at time i, $d_i$ represents the first acceleration value at time i, $R_i$ is a relative rotation amount of the gyroscope at the $i^{th}$ frame in a video, $R_i = \exp[-\omega_i \cdot \Delta t]_x$, $\omega_i$ represents the angular velocity value at time i, $$d'_{i-1}$$

represents the first acceleration value after low-pass filtering and noise reduction at the time (i−1), α represents a smoothing factor, $$\alpha = \frac{\Delta t}{Rc + \Delta t}, Rc = \frac{1}{2\pi f_c},$$

where, $f_c$ represents a cutoff frequency of the low-pass filter, $R_c$ represents a time constant, and $\Delta t$ represents a sampling interval of gyroscope data.

6. The method according to claim 5, wherein the step of converting the first acceleration value from the IMU coordinate system to the world coordinate system to obtain the second acceleration value comprises:

according to the formula $$A_w^k = R_{i\_w}^{k-1} * d_i'$$

at time k, converting the first acceleration value from the IMU coordinate system to the world coordinate system to obtain the second acceleration value $$A_w^K, \text{ where } R_{i\_w}^k$$

is an estimated rotation amount from the IMU coordinate system to the world coordinate system, and $$d_i'$$

is the first acceleration value after low-pass filtering and noise reduction.

7. The method according to claim 6, wherein the step of, in the world coordinate system, filtering the second acceleration value to remove the gravitational acceleration to obtain a third acceleration value comprises:

in the world coordinate system, at time k, filtering the second acceleration value $$A_w^K$$

to remove the gravitational acceleration, and obtaining the third acceleration value $$Acc_w^k.$$

8. The method according to claim 7, wherein before filtering the second acceleration value, the method further comprises a step of:

in the world coordinate system, at time k, performing noise reduction on the second acceleration value $$A_w^K.$$

9. The method according to claim 1, wherein the step of converting the third acceleration value into the IMU coordinate system to obtain acceleration components along the X axis, the Y axis and the Z axis of the fourth acceleration value comprises:

calculating the fourth acceleration value $$Acc_{imu}^k$$

according to a formula:

$$Acc_{imu}^k = R_{i\_w}^{k-1} Acc_w^k, \text{ where } R_{i\_w}^{k-1}$$

is a rotation matrix from the world coordinate system to the IMU coordinate system at time k, and $$Acc_w^k$$

is the third acceleration value.

10. The method according to claim 1, wherein after the step of determining the rotation direction of the gyroscope on the basis of the acceleration components along the X axis, the Y axis and the Z axis of the fourth acceleration value, the method further comprises steps of:

determining the rotation direction of the gyroscope as a rotation direction of the camera, and determining a positional relationship between the camera and the rotation axis on the basis of the rotation direction of the gyroscope.

11. A non-transitory computer-readable storage medium, the computer-readable storage medium storing a computer program, which when being executed by a processor, cause the processor to perform the steps of the method of claim 1.

12. A computer device, comprising:
one or more processors;
a memory; and
one or more computer programs, the processors and the memory being connected by a bus, wherein the one or more computer programs are stored in the memory, which when being executed by the one or more processors, cause the one or more processors to perform the steps of the method of claim 1.

13. A method for obtaining a bullet-time photography effect, comprising steps of:
capturing a panoramic video using a camera to rotate around a shooting target;
obtaining an acceleration value and an angular velocity value of an IMU in real time;
determining the acceleration value as a first acceleration value, and estimating an attitude from an IMU coordinate system to a world coordinate system;
converting the first acceleration value from the IMU coordinate system to the world coordinate system to obtain a second acceleration value;
in the world coordinate system, filtering the second acceleration value to remove a gravitational acceleration to obtain a third acceleration value;
converting the third acceleration value into the IMU coordinate system to obtain acceleration components along the X axis, the Y axis and the Z axis of a fourth acceleration value; and
determining a rotation direction of the gyroscope on the basis of the acceleration components along a X axis, a Y axis and a Z axis of the fourth acceleration value; and generating images corresponding to the rotation direction of the gyroscope in the panoramic video on the basis of the rotation direction of the gyroscope, wherein the step of determining the rotation direction of the gyroscope on the basis of the acceleration components along the X axis, the Y axis and the Z axis of the fourth acceleration comprises:

comparing the acceleration components along the X axis, the Y axis and the Z axis of the fourth acceleration value to determine an axis corresponding to a maximum acceleration component, and determining the rotation direction of the gyroscope as: a direction of a rotation axis when the axis, corresponding to and in the same direction as the maximum acceleration component, rotates towards a camera.

14. A camera, comprising:

one or more processors;

a memory; and one or more computer programs, the processors and the memory being connected by a bus, wherein the one or more computer programs are stored in the memory and configured to be executed by the one or more processors, which when being executed by the one or more processors, cause the one or more processors to perform a method for determining a rotation direction of a gyroscope, comprising steps of:

obtaining an acceleration value and an angular velocity value of an IMU in real time, determining the acceleration value as a first acceleration value, and estimating an attitude from an IMU coordinate system to a world coordinate system;

converting the first acceleration value from the IMU coordinate system to the world coordinate system to obtain a second acceleration value;

in the world coordinate system, filtering the second acceleration value to remove a gravitational acceleration to obtain a third acceleration value;

converting the third acceleration value into the IMU coordinate system to obtain acceleration components along a X axis, a Y axis and a Z axis of a fourth acceleration value; and determining a rotation direction of the gyroscope on the basis of the acceleration components along the X axis, the Y axis and the Z axis of the fourth acceleration value, wherein the step of determining the rotation direction of the gyroscope on the basis of the acceleration components along the X axis, the Y axis and the Z axis of the fourth acceleration comprises:

comparing the acceleration components along the X axis, the Y axis and the Z axis of the fourth acceleration value to determine an axis corresponding to a maximum acceleration component, and determining the rotation direction of the gyroscope as: a direction of a rotation axis when the axis, corresponding to and in the same direction as the maximum acceleration component, rotates towards a camera.

15. A non-transitory computer-readable medium having computer programs stored thereon, which when being executed by a processor, cause the processor to perform the steps of the method of claim 13.

16. A computer device, comprising:

one or more processors;

a memory; and one or more computer programs, the processors and the memory being connected by a bus, wherein the one or more computer programs are stored in the memory, which when being executed by the one or more processors, cause the one or more processors to perform the steps of the method of claim 13.

17. A camera, comprising:

one or more processors;

a memory; and one or more computer programs, the processors and the memory being connected by a bus, wherein the one or more computer programs are stored in the memory and configured to be executed by the one or more processors, which when being executed by the one or more processors, cause the one or more processors to perform the steps of the method of claim 13.

* * * * *